J. C. Flint,
Cutting Leather.

Nº 8,510.          Patented Nov. 11, 1851.

N. PETERS, PHOTO-LITHOGRAPHER, WASHINGTON, D. C.

UNITED STATES PATENT OFFICE.

JACOB C. FLINT, OF BOSTON, MASSACHUSETTS.

MACHINE FOR CUTTING HIDES.

Specification of Letters Patent No. 8,510, dated November 11, 1851.

*To all whom it may concern:*

Be it known that I, JACOB C. FLINT, of Boston, in the county of Suffolk and State of Massachusetts, have invented a new and useful or Improved Machine for Cutting or Reducing Dry Hide to a Strip and Removing the Hair from such Strip; and I do hereby declare that the same is fully described and represented in the following specification and accompanying drawings, letters, figures, and references thereof.

Figure 1:
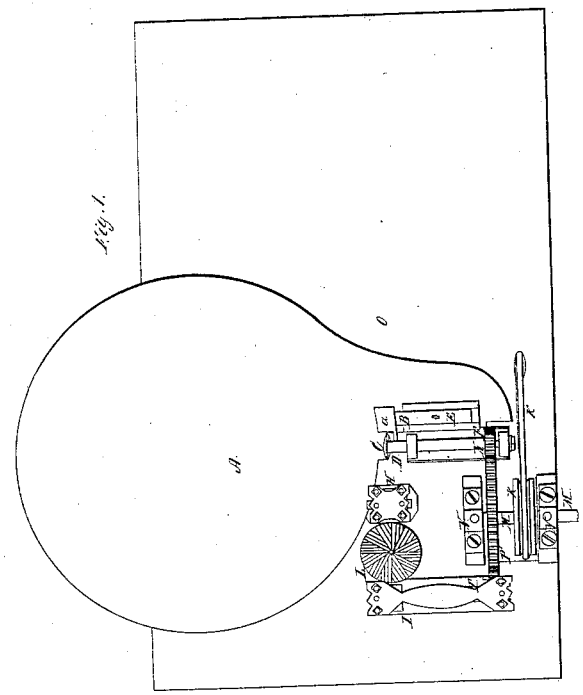
Figure 2:
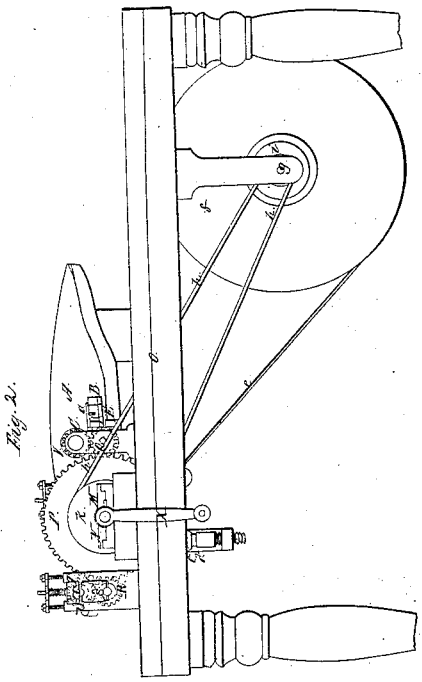
Figure 4:
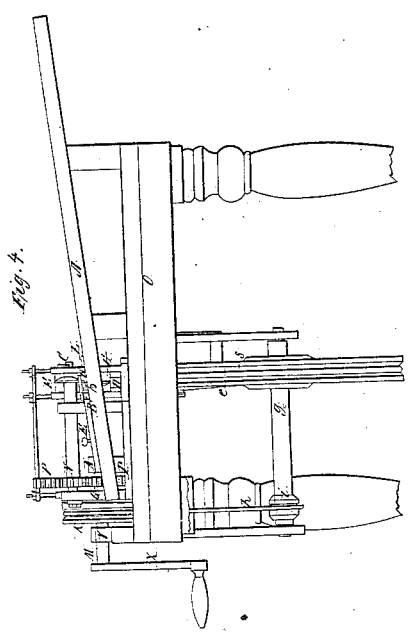
Figure 3:
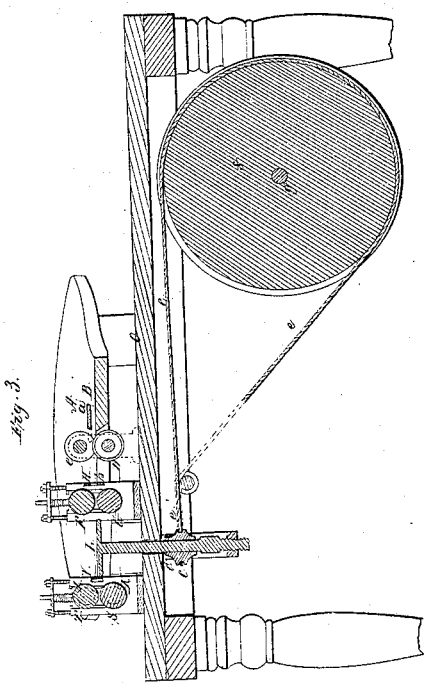

Of the said drawings Figure 1, denotes a top view of my said machine. Fig. 2 is a front elevation of it. Fig. 3 is a vertical section of it, taken through the holding and draw rollers, and cutter for removing the hair from the strip of hide. Fig. 4 is an end view of the machine.

In the said figures it is an inclined board or table, on which the piece of hide to be reduced is laid with its hair side down, or resting directly on the table. The said table is arranged with its upper surface on such an inclination to the horizon, as to facilitate the downward movement of the hide toward its gage or rest, B. This gage or rest consists of a sliding plate B, capable of being moved either toward or away from the plane of the sides of the rotary shears, C, D, and fixed in position by a set screw E. It has a lip $a$ extended from its front end, and above the top surface of the table, a distance equal to or a little greater than the usual maximum thickness of the hide; the object of such lip being to hold the hide down against the table in order that it may be properly presented to the rotary cutters or shears. These rotary shears are arranged with respect to the lip or gage, and table, as seen in the drawings.

A pair of pressure rollers F, G, is disposed in respect to the rotary shears as seen in the drawings, the upper of the said rollers being pressed down toward the lower one, by springs. Between these rollers and the shears is a stationary guide plate H, which has a hole $b$, made through it, of the shape and proper size to lead the strip of hide to the middle of the said two rollers. There are also two draft rollers I, K, arranged at a short distance from the pressure or holding rollers F, G, and between these two sets of rollers there is a rotary horizontal cutter L, whose upper surface is provided with teeth cutters, such as will remove the hair from the under side of the strip of hide when the said strip is in motion, over and against the cutter L, and the said cutter is in revolution.

The driving shaft of the machine is seen at M. It is supported in suitable boxes N, N, on the of or above the main frame or bench O, which sustains the operative parts of the machine. On this shaft is a gear wheel P, which is made to engage with the pinions Q, R, the former of which is fixed on the shaft of the lower cutter of the rotary shears, while the latter is fixed on the shaft S of the lower draft roller K. The two shafts, S, T, of these draft rollers, arranged as seen in the drawings are geared together by the gears R, U. So with the two shafts of the rotary shears, they are similarly geared together so as to simultaneously rotate, these gears being seen at Q, V.

The rotary cutter L, is put in motion by means of a pulley $c$, (fixed on its shaft $d$) an endless band $e$ (passing around the said pulley and another and large pulley $f$ fixed on a shaft $g$,) which is put in revolution by means of an endless band $h$, which works around a small pulley $i$ (fixed on the shaft $g$) and a larger pulley K, fixed on the driving shaft M. The said driving shaft is to be put in motion by the hand applied to a crank X, fixed on it, or by any other suitable means.

In operating with this machine the piece of hide having the hair on it, is laid on the inclined table A, and against the end of the gage R, and so as to enable the rotary shears to cut into it. The machinery being put in motion the shears will cut into the hide and sever a strip from its edge. The strip is carried through the guide plate H, and between the holding rollers F, G, thence over and against the top of the cutter wheel L, and thence through another guide plate Y, and finally between the two draft rollers L, K, which latter seize the strip and draw it forward, and so as to pull the hide continually against the rotary shears, and cause them to separate the strip from the hide in a spiral line. During the passage of the strip over the cutter L, the hair on the lower side of the strip, is removed by said cutter.

What I claim as my invention is—

The combination of mechanism for reducing dry hide to a strip, and mechanism for cutting or removing the hair from the underside of the said strip, at one continued operation, substantially in the manner as described.

In testimony whereof I have hereunto set my signature this twenty-ninth day of July, in the year A. D. 1851.

JACOB C. FLINT.

Witnesses:
R. H. EDDY,
JOHN NOBLE.